March 18, 1947.  C. FISCHER  2,417,641

TIMER

Filed Jan. 24, 1945   2 Sheets-Sheet 1

INVENTOR.
Charles Fischer
BY Harry Jacobson
ATTORNEY

March 18, 1947.  C. FISCHER  2,417,641
TIMER
Filed Jan. 24, 1945  2 Sheets-Sheet 2
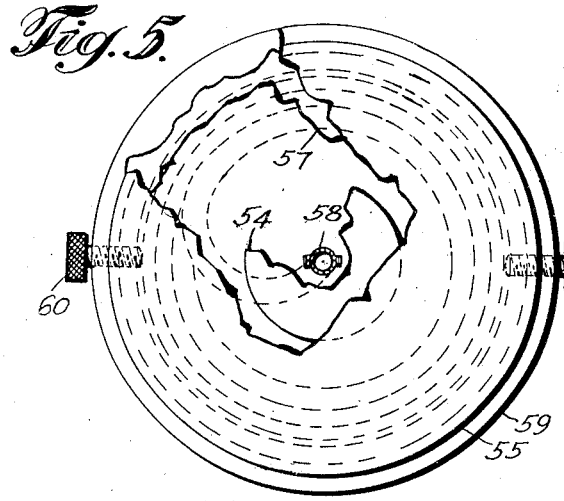
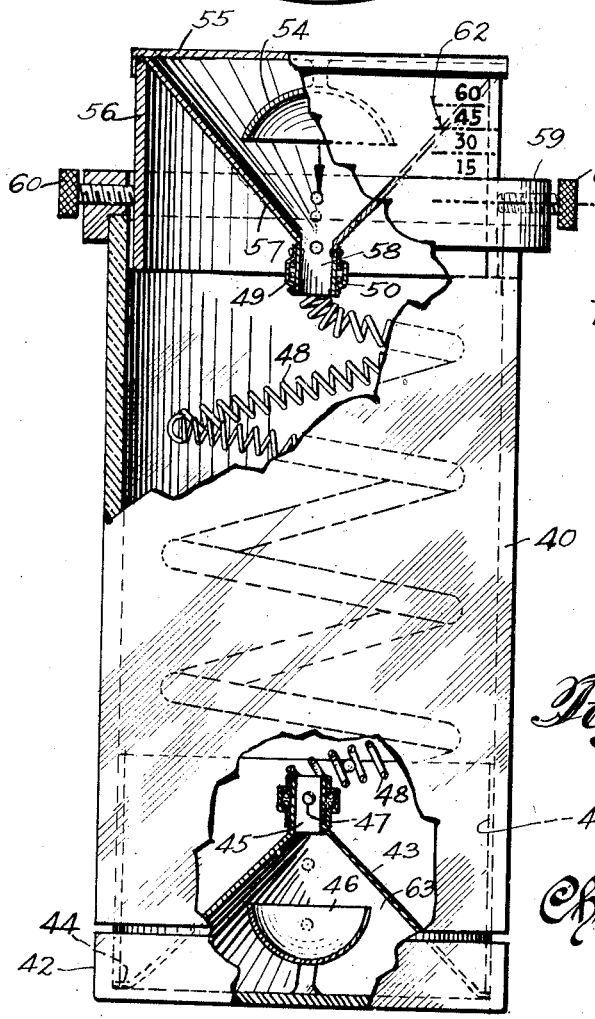
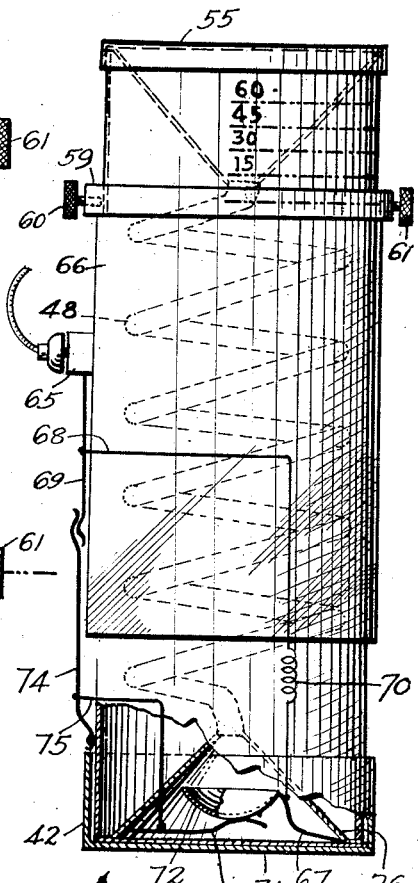
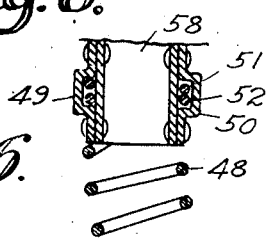
INVENTOR.
Charles Fischer
BY Harry Jacobson
ATTORNEY Patented Mar. 18, 1947

2,417,641

UNITED STATES PATENT OFFICE 2,417,641

TIMER

Charles Fischer, New York, N. Y.

Application January 24, 1945, Serial No. 574,429

17 Claims. (Cl. 161—23)

1

This invention relates to timers and particularly to that type operated by gravity.

The invention contemplates the provision of a simple and comparatively inexpensive but dependable and accurate device for producing an audible or other signal automatically at the end of a predetermined interval after a ball has been started on its path through the device, or permitting the ball to be seen at the end of its travel after such interval of time.

The invention further contemplates means for so retarding the otherwise free movement of a ball acted upon by gravity that the ball does not roll smoothly or at a uniformly accelerated rate through said means, but instead has a jerky or alternately accelerated and retarded motion, whereby the time required for the ball to complete its run is easily measurable and may accurately be predetermined.

The invention further contemplates the provision of a hollow coiled wire member having a non-linear longitudinal axis to provide a tortuous passage therethrough to form a ball chute having a predetermined slope or pitch and through which a ball may drop in a predetermined time, a sounding device being optionally positioned adjacent the lower end of the chute and in the path of the ball for operation thereby, or the sounding device may be omitted, or replaced by a transparent casing to permit the ball to be seen at the end of its run.

The invention further contemplates the provision of a self-contained timer requiring no handling of the ball or balls and set into operation merely by inverting it like an hour glass.

The invention further contemplates the provision of simple means for adjusting the ball retarding chute so as to vary the time it takes for the ball to move from one end of the chute to the other end.

The various objects of the invention will be clear from the description which follows and from the drawings, in which, Fig. 1 is a front view of a simple and inexpensive form of the device wherein the balls are manually handled for each operation, showing an adjusted position of the ball chute in dash dot lines.

Fig. 5 is a top plan view, partly broken away, of a modified form of the invention consisting of an adjustable self-contained unit in which the ball is visible when it emerges from the chute, means for producing an audible signal if desired also being shown.

Fig. 6 is a front elevation of the same partly in section.

Fig. 7 is a similar view of a modified form of the device wherein the audible or other signal may be electrically produced or controlled by the ball.

Fig. 8 is a fragmentary vertical section of the connection between the chute and the member which confines and guides the ball.

Figure 2:
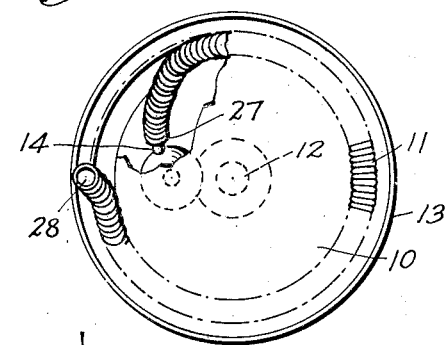
Fig. 2 is a top plan view of the same partly broken away.
Figure 1:
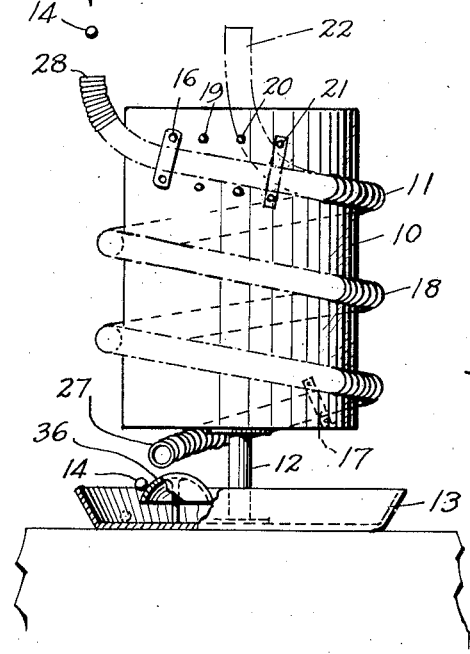

In the practical embodiment of the invention shown by way of example in Figs. 1 and 2, a suitable support as 10 for the coiled member 11 (which will hereinafter be referred to as a chute) is held as by the post 12 in vertical spaced relation to the base 13. Said base is preferably is in form of a pan to receive and confine a ball as 14 rolling through and dropping out of the chute. The chute is an important feature of the invention, since it is of simple and inexpensive construction yet it serves as an automatic retardant of the movement of the ball therethrough whereby the discharge of the ball from the chute is delayed far beyond the time required for the ball to drop through a smooth similar chute of the same length and slope. Furthermore, the chute being flexible, a considerable range of adjustment thereof is possible, and the time elapsing from the insertion of the ball into the upper end thereof to the emergence of the ball therefrom may therefore be considerably varied. In its simplest form, the chute 11 comprises a length of coiled round wire, that is, wire of preferably circular cross sectional shape. The individual coils 15 of the chute are slightly spaced apart (Fig. 4), and the chute is bent so that its longitudnal axis is substantially helical by winding the chute around the support 10.

To secure the chute to its support, a pair of suitable clips as 16, 17 may be provided, one near each end of the chute, at least one of the clips being removably held to the support. As shown, screws or the like are employed for the clip 16, so that on loosening said screws, the slope or pitch of the chute may be adjusted, the length of the chute between the holding clips 16 and 17 may be increased or decreased, and the bends 16 may be changed by changing the number of turns. The same effect may be obtained by moving the clip 16 and its holding screws to a selected one of a number of different positions indicated by the pairs of holes 19, 20 and 21, one adjusted position of said clip and of the end of the chute being shown by the dash-dot lines of Fig. 1. The height of the chute between the clips, or the length of the chute, or the number of turns thereof, or its slope, or all of these factors determining the required time, being thus altered, the time it takes for the ball 14 to roll through the chute is also changed and said time may be predetermined.

Owing to the use of round wire and the slight spacing apart of the coils 15 (Fig. 4) the ball also may be so proportioned relatively to the diameter of the wire and the inner diameter of the coils, that the ball is retarded more or less during its travel through the chute. For slow movement of the ball, the space between coils is comparatively large and the slope of the chute is comparatively small, while the diameter of the ball may be about three times the spacing between the centers of the coils. With these proportions, the ball drops temporarily into the space 23 between coils 15 as shown by the dotted lines of Fig. 4. However, momentum carries the ball over the crest or highest point of the interior of the lowermost part of the lower coil, so that the ball climbs over the crest and topples into the next space 23 where it is slowed by the crest of the next coil, the operation being repeated throughout the length of the chute. The general path of motion of the center of the ball is a sinuous line, but the mean path is indicated by the line 24 and the direction of rotation of the ball is indicated by the arrow of Fig. 4.

Figure 4:
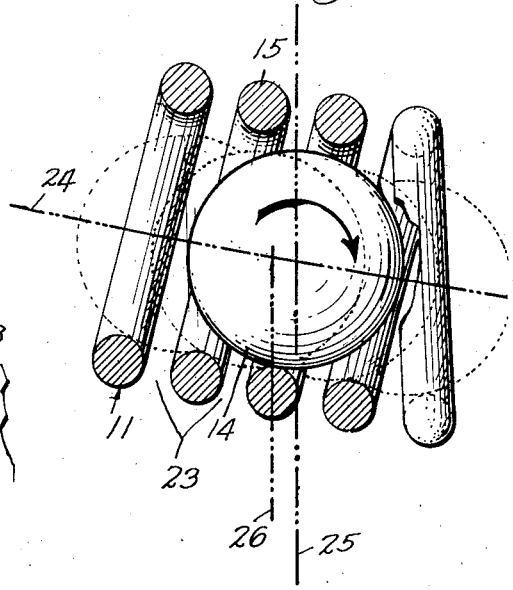
Fig. 4 is a fragmentary longitudinal sectional view of the coiled ball chute and of the ball dropping therethrough showing in dotted lines various positions assumed by the ball as it mounts the crest of a coil.

It will be noted that the center of gravity of the ball (indicated by the vertical line 25 passing therethrough) changes from a point slightly to the left of the crest of the lower coil (indicated by the vertical line 26 passing therethrough) with which crest the ball is in contact when in the space 23, to a point to the right of said crest by reason of the ball's momentum as the parts are proportioned in Fig. 4. This results in comparatively slow movement. In any case, the alternate crests and spaces of the chute cooperate to form obstructions to the free movement of the ball, so that the chute may be considered in some respects as the equivalent of a smooth surface having a number of obstructions thereon, or of a corrugated surface.

When the slope of the chute is increased, or the spaces 23 decreased, or the diameter of the ball enlarged, or the cross-sectional diameter of the chute wire decreased, the line 25 may be made to fall to the right of the line 26 when the ball is in the space 23. In that case, the momentum of the ball need not be depended on to cause the ball to climb and to carry it past the crest of the lower coil adjacent the ball, since gravity alone performs that operation, and the velocity of the ball is therefore greater than in the case shown in Fig. 4.

It will therefore be understood that by varying the proportions of the parts as indicated, a chute and coacting ball may readily be designed to give the desired time interval between the instant the ball is dropped into the upper end of the chute and the instant it drops out of the chute.

To produce an audible signal at the end of said interval, a suitable bell or the like as 36 is supported by the base 13 in the path of the ball and adjacent the lower end 27 of the chute. The ball strikes the bell and produces the sound signal signifying the end of the time interval, after which it drops into the pan. To repeat the operation, the ball is taken out of the pan and again dropped into the upper end 28 of the chute.

Figure 3:
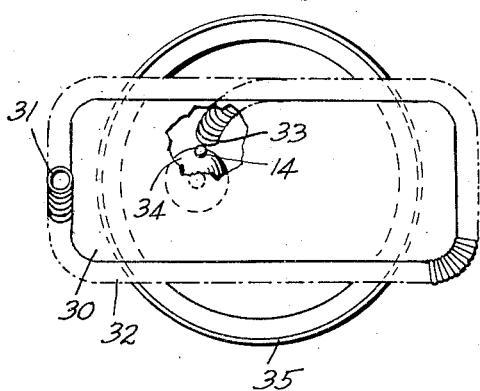
Fig. 3 is a similar view of a modified form of the same wherein the support for the ball chute is generally rectangular in cross section.

As shown in Fig. 3, it is not necessary that the chute assume the shape of a cylindrical helix. By this is meant that the chute may be bent around a support as 30 having a non-circular cross sectional shape, being shown as substantially rectangular. The ball is dropped into the upper end 31 of the chute 32 and drops jerkily and comparatively slowly therethrough until it emerges from the lower end 33, strikes the bell 34 to produce an audible signal and drops into the pan-like base 35 from which it is removed manually to repeat the operation.

In Figs. 5, 6 and 7 are shown self-contained forms of the invention, which also permit the ball to be seen when it drops out of the chute. In the modification of Figs. 5 and 6, the transparent chute casing 40 is preferably cemented or otherwise secured to the upper portion of the transparent sleeve 41 while the cup-like base or cap 42 is frictionally held to the lower part of the sleeve to permit its removal when access to the interior of the casing is desired. The transparent conical or funnel-like member 43 is provided with an annular flange 44 clamped between the base and the lower end of the sleeve and is provided with a constricted or reduced tubular outlet 45. Supported by the cap or base 42 preferably coaxially of the outlet is the bell-like sounding element 46 also in the shape of a cup and adapted to receive and retain therein the balls 47 dropping out of the chute 48. Said chute is similar to the chute previously described being made of a plurality of coils of round wire properly spaced, with the axis of the chute bent into a number of turns, but the chute in this case may be without any central support. Instead, the lower end portion of the chute is suitably secured to the outlet tube 45 as by passing the tube through some of the end coils of the chute and retaining the coils in place in any suitable manner. As shown in Fig. 8, the coils 51, 52 are secured by the clips 49, 50 each fastened to the tube 58 or 45, said coils being threaded or turned through the spaces 53 of the clips if desired.

The cup 45 is of sufficient diameter to obstruct the major part of the space 63 so that a ball falling out of the chute is retained in the cup or at least retained in the funnel 43, whereby when the device is inverted from the position of Fig. 6, the balls in the cup or funnel fall into the tube 45 and drop down the chute to be received in the similar cup 54 at the other end of the device. Said cup 54 is supported by the cap 55 frictionally secured to the transparent sleeve 56. The transparent conical member or funnel 57 is similar to the member 43 and is similarly held, and is also provided with an outlet tube 58 to which the upper end of the chute is secured.

However, the sleeve 56 is adjustable axially within the casing 40 to change the vertical distance between the ends of the chute and also to change the slope or pitch of the turns of the chute, whereby the time it takes for the ball to roll through the chute may be quickly and easily adjusted. As shown, the collar 59 is secured to the upper end of the casing 40 and carries a pair of set screws 60, 61 adapted to be tightened against the sleeve 56 to hold it in adjusted position and against movement relatively to the casing. Markings as 62 on the casing indicate the time, in the various positions of the sleeve, elapsing between the moment the device is inverted and the moment the ball drops out of the chute. For example, when the upper edge of the collar is brought to the line marked "15" in Fig. 6 and there secured, it would take 15 seconds for the ball to complete its journey. The ball is visible through the transparent members so that it can be seen when it drops out of the chute, in case the sound caused by the ball striking the cup 46 is deemed to be an inadequate signal. To insure that the user would be visibly apprised of the end of the time interval required, a plurality of balls may be confined within the device so that if the end of the movement of one is missed, the user will see at least one of the others.

The device is used in much the same manner as an hour glass. That is, it is inverted from either given position and the time is reckoned from the moment the device is set down in the inverted position to the moment the ball drops out of the chute into its receiving cup or when it strikes the cup to make a sound.

In Fig. 7 is shown an electrically operated signal actuated by the weight of the balls, said signal being preferably in addition to the other signals described in connection with the form of the invention shown in Figs. 5 and 6. As shown, said electric signal is an audible one, taking the form of an electric bell 65 carried by the casing 66. It will be understood however, that any electrically operated audible or visible signal may be substituted for the bell if desired. One terminal of the bell is electrically connected to the switch member 67 as by the diagrammatically shown lead 68 and the conductor 69, a suitable loop as 70 being provided if desired in the lead 68 to permit adjustment of the parts connected thereby. The switch member 67 is suitably insulated from and held by the funnel member 76 and the cap 71, and is resilient to permit sufficient vertical movement of the ball-receiving cup or bell 72 carried thereby to allow said cup to make contact with the switch member 73. The member 73 is also insulated from and supported by the parts 70 and 71 and is electrically connected to the conductor 74 by the lead 75. The conductors 69 and 74 are arranged in contacting overlapping relation to permit adjustment of the casing if desired without breaking contact.

It will be seen that the weight of the balls when in the cup depresses the resilient switch member 67 and permits the cup to close the circuit to the bell by contact with the switch member 73 when current is supplied to the bell. Parts substantially identical with the parts 72, 67, 73, 69 and 75 may be provided at the upper end of the device to function in the same manner as described when the device is inverted.

When the circuit at the lower end of the timer is closed, that at the upper end, as viewed in Fig. 7, is open. However, when the device is inverted, the balls fall out of the cup 72, and the member 67 acts on the thus unweighted cup to break its contact with the member 73 and to open the circuit to the bell. Said circuit remains open until the balls complete their passage through the chute, drop into the cup at the other end of the device, and thus weight the latter cup sufficiently to close the circuit again. The time between the inversion of the device and the sounding of the bell is the interval required.

For the purpose of correcting any inaccuracies in the markings 62 of the sleeve 56 of Fig. 7, the casing 66, instead of being fastened to the sleeve 41 as in Fig. 6, is frictionally mounted thereon so that it can be forced axially along the sleeve to a desired accurate adjusted position and the timing accurately determined by testing. In the others respects not above differentiated, the modification of Fig. 7 is the same as that of Fig. 6.

It will now be understood that by reason of the obstructions automatically formed in the chute when it is made of a number of slightly spaced apart coils of round wire, the balls are delayed in their fall through the chute so that the time it takes for said fall can be accurately determined and the device calibrated accordingly. It will also be seen that I have provided a simple, accurate and inexpensive timing device dependent only on gravity for its operation, providing visible or audible signals or both and operated merely by inversion, or by inserting balls manually into the chute as desired.

Changes may be made in the specific forms of the inventions shown and described without departing from the spirit of the invention set out in the appended claims, and hence the description and drawings are intended to be illustrative and not limitative.

I claim:

1. In a timing device, a ball chute of coiled round wire arranged with one end higher than the other, a ball adapted to drop through the chute and signal producing means operated by the ball and adjacent the lower end of the chute.

2. In a timing device, a chute of coiled round wire arranged in an inclined position, a ball adapted to strike the crests of the coils of the chute as it drops through the chute and thereby to have its drop retarded, and means to receive the ball dropping out of the chute.

3. In a timing device, a hollow inclined ball chute having a passage therethrough through which a ball may drop, said chute being integrally formed with ball-receiving recesses to retard the otherwise uniformly accelerated rolling movement of the ball under the influence of gravity, said recesses being of insufficient size to halt the movement of the ball completely.

4. In a timing device, a hollow inclined ball chute of coiled round wire, a ball adapted to drop through the chute, and means supporting the chute with the ends of the chute visible whereby the ball is visible when it emerges from the chute and an observer is apprised of the time interval between the insertion of the ball into the upper end of the chute and the emergence of the ball from the lower end of the chute.

5. In a timing device, a ball, a flexible ball chute having the longitudinal axis thereof in the general form of a helix, said chute having an adjustable downward slope and being provided with alternate depressions and projections to retard the ball rolling along the chute, and sound producing means at a predetermined point of the path of the ball and operated thereby.

6. In a timing device, a ball, a flexible ball chute comprising an elongated member having a plurality of helical coils, said chute having the longitudinal axis thereof in the general form of a helix, said chute having a downward slope, and means for adjustably supporting the chute for varying the vertical height between the ends thereof, said means including a tubular member concentric with and arranged adjacent the chute, and an adjustable connection between the member and an end part of the chute.

7. In a timing device, a flexible inclined ball chute of a length of round wire having coils of the same diameter and thereby providing a corrugated surface in the interior of the chute for a ball to roll upon, the longitudinal axis of the chute having a number of turns, and means for adjustably supporting the chute.

8. A timing device according to claim 7 including a ball adapted to roll through the interior of the chute and means in the path of the ball and at the lower end of the chute and operated by the ball to produce a sound signal.

9. In a timing device, a hollow flexible inclined chute of coiled wire and having a non-linear longitudinal axis, said chute having a tortuous ball passage therethrough, and means adjustably supporting the chute to vary the effective vertical distance between the end thereof.

10. A timing device according to claim 9 including a ball to roll through the passage with an interrupted movement produced by the convexity of the cross section of the coils of the chute, and means responsive to the dropping of the ball thereon for producing a signal.

11. A timing device comprising a hollow inclined chute of coiled wire having a ball passage therethrough, a funnel-like member at each end of and communicating with the passage, a casing for the members, a ball within the casing and adapted to be retained in position to drop through the chute by said members when the device is inverted, and means for closing the outer ends of the members.

12. A self-contained timing device comprising a ball, a transparent container for the ball including a casing and a pair of funnel-like members arranged at the respective ends of the casing, and a flexible hollow inclined chute of coiled wire connecting the members and forming a passage for the ball to move from one of the members to the other when the device is inverted.

13. A self-contained timing device according to claim 12 provided with means for varying the height of the chute.

14. A self-contained timing device according to claim 12 in which is provided a sleeve carrying one of the members and mounted to telescope into the casing to vary the distance between the ends of the chute and thereby to vary the time it takes for the ball to roll through the passage.

15. A self-contained timing device according to claim 12 provided with means to adjust the distance between the ends of the chute and in which the chute has a non-linear longitudinal axis.

16. In a timing device, a ball, a chute provided with a passage for movement of the ball therethrough by gravity, said chute having a plurality of openings therein of lesser width than the radius of the ball whereby the lower part of the ball drops into and rolls out of the openings successively as the ball rolls down the passage thereby retarding the ball in its movement, said openings each being of insufficient width to halt the movement of the ball completely.

17. In a timing device, a ball, a flexible ball chute having the longitudinal axis thereof in the general form of a helix, said chute having a downward slope and being provided at spaced intervals with means to retard without halting the movement of a ball rolling along the chute, and means operated by the ball for producing a signal.

CHARLES FISCHER.

REFERENCES CITED

The following references are of record in the file of this patent:

UNITED STATES PATENTS

| Number | Name | Date |
| --- | --- | --- |
| 1,993,669 | Ihde | Mar. 5, 1935 |
| 634,012 | Mattes et al. | Oct. 3, 1899 |